(12) United States Patent
Chen et al.

(10) Patent No.: US 10,382,175 B2
(45) Date of Patent: Aug. 13, 2019

(54) ADAPTIVE DOWNLINK COORDINATED MULTI-POINTS TRANSMISSION METHOD AND DEVICE

(71) Applicant: DATANG MOBILE COMMUNICATIONS EQUIPMENT CO., LTD, Beijing (CN)

(72) Inventors: Xianguo Chen, Beijing (CN); Yiming Jiang, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 73 days.

(21) Appl. No.: 15/564,093

(22) PCT Filed: Jan. 21, 2016

(86) PCT No.: PCT/CN2016/071566
§ 371 (c)(1),
(2) Date: Oct. 3, 2017

(87) PCT Pub. No.: WO2016/165436
PCT Pub. Date: Oct. 20, 2016

(65) Prior Publication Data
US 2018/0139017 A1    May 17, 2018

(30) Foreign Application Priority Data

Apr. 14, 2015   (CN) .......................... 2015 1 0175893

(51) Int. Cl.
*H04L 5/00*     (2006.01)
*H04W 72/04*    (2009.01)
(Continued)

(52) U.S. Cl.
CPC .......... *H04L 5/0035* (2013.01); *H04B 7/024* (2013.01); *H04W 28/20* (2013.01); *H04W 28/22* (2013.01); *H04W 72/042* (2013.01); *H04W 88/10* (2013.01)

(58) Field of Classification Search
CPC .. H04L 5/0035; H04W 28/20; H04W 72/042; H04W 88/10; H04W 28/22
See application file for complete search history.

(56) References Cited

U.S. PATENT DOCUMENTS

2012/0044870 A1* 2/2012 Mochizuki ............. H04B 7/024
                                                            370/328
2014/0057640 A1   2/2014 Nagata et al.
(Continued)

FOREIGN PATENT DOCUMENTS

CN      101888665      11/2010
CN      101998327      3/2011
(Continued)

OTHER PUBLICATIONS

English language abstract of CN 104780032 published Jul. 15, 2015.
(Continued)

*Primary Examiner* — Gbemileke J Onamuti
(74) *Attorney, Agent, or Firm* — Kilpatrick Townsend & Stockton LLP

(57) ABSTRACT

An adaptive downlink Coordinated Multi-Points (CoMP) transmission method and device are provided. The method includes: determining each coordinating cell corresponding to the serving cell of the downlink CoMP User Equipment (UE); counting the cell load value of each coordinating cell; on the basis of the cell load value of each coordinating cell, determining the transmission manner adopted by each coordinating cell for the downlink CoMP UE, and counting the number of coordinating cells corresponding to each trans-
(Continued)

mission manner; and on the basis of the number of coordinating cells corresponding to each transmission manner, determining the transmission manner of the downlink CoMP UE.

10 Claims, 2 Drawing Sheets

(51) Int. Cl.
   *H04W 28/22* (2009.01)
   *H04W 28/20* (2009.01)
   *H04W 88/10* (2009.01)
   *H04B 7/024* (2017.01)

(56) References Cited

U.S. PATENT DOCUMENTS

| | | | | |
|---|---|---|---|---|
| 2014/0233466 | A1* | 8/2014 | Pourahmadi | H04L 5/0051 370/329 |
| 2015/0358989 | A1 | 12/2015 | Ni et al. | |

FOREIGN PATENT DOCUMENTS

| | | |
|---|---|---|
| CN | 102076021 | 5/2011 |
| CN | 102098737 | 6/2011 |
| CN | 103347283 | 10/2013 |
| CN | 103825677 | 5/2014 |
| CN | 103945556 | 7/2014 |
| CN | 104639224 | 5/2015 |
| CN | 104780032 | 7/2015 |

OTHER PUBLICATIONS

English language abstract of CN 101888665 published Nov. 17, 2010.
English language abstract of CN 103825677published May 28, 2014.
English language abstract of CN 103945556 published Jul. 23, 2014.
English language abstract of CN 101998327 published Mar. 30, 2011.
English language abstract of CN 102076021 published May 25, 2011.
English language abstract of CN 102098737published Jun. 15, 2011.
English language abstract of CN 103347283 published Oct. 9, 2013.
English language abstract of CN 104639224 published May 20, 2015.
Search Report (with English language translation) Issued in International Application No. PCT/CN2016/071566 dated Apr. 28, 2016.

* cited by examiner

ADAPTIVE DOWNLINK COORDINATED MULTI-POINTS TRANSMISSION METHOD AND DEVICE

CROSS REFERENCE TO RELATED APPLICATIONS

This application is a US National Stage of International Application No. PCT/CN2016/071566, filed on Jan. 21, 2016, designating the United States and claiming priority to Chinese Patent Application No. 201510175893.8, filed with the Chinese Patent Office on Apr. 14, 2015 and entitled "Method and apparatus for adaptive downlink CoMP transmission", the content of which is hereby incorporated by reference in its entirety.

FIELD

The present disclosure relates to the field of wireless technology, and particularly to a method and apparatus for adaptive CoMP transmission.

BACKGROUND

In the Long Term Evolution (LTE) system, there is generally low interference within a cell due to the use of Orthogonal Frequency Division Multiplexing (OFDM), and high inter-cell interference arising from inter-cell frequency multiplexing is predominant interference in the LTE system that results in poor performance at edges of cells. In order to improve the performance of a cell edge user, and to accommodate the required cell edge spectrum efficiency, the technology of Coordinated Multi-Point (CoMP) transmission and reception has been introduced to the Long Term Evolution-Advanced (LTE-A) system. In the CoMP technology, a plurality of adjacent base stations or nodes cooperate with each other, thereby serving a cell edge user concurrently, so as to lower same-frequency interference from an adjacent cell received by the cell edge user, and to improve the quality of service of the cell edge user, where there are generally two categories of downlink CoMP transmission technologies: the Joint Transmission (JT) and the Coordinated Scheduling/Coordinated Beam-forming (CS/CB).

For the JT technology, a serving cell and a coordinating cell transmit same Physical Downlink Shared Channel (PDSCH) data to a same User Equipment (UE) at an edge of a cell over a same time-frequency resource, due to elimination of same-frequency interference from an adjacent cell and due to superimposition of downlink signal, downlink performance of the UE at the edge of the cell is improved; for the CS technology, a serving cell transmits PDSCH downlink data to a cell edge UE, and a coordinating cell does not transmit any PDSCH data over the same time-frequency resource, thus eliminating same-frequency interference from an adjacent cell, and improving downlink performance of the UE at an edge of a cell; and for the CB technology, a serving cell and a coordinating cell transmit downlink data respectively to different UEs over a same time-frequency resource, but beam-forming of the UE in the serving cell needs to be spaced from beam-forming of the UE in the coordinating cell, to alleviate interference between them and improve downlink performance of the UEs at an edge of a cell.

Among the technologies of downlink CoMP transmission, the technologies of JT and the CS could alleviate effectively for a user at an edge of a cell same-frequency interference from another user in an adjacent cell, but an additional time-frequency resource in a coordinating cell needs to be occupied, and if the coordinating cell has a heavy load, then the average throughput of the coordinating cell may be lowered when using the technologies of JT and the CS. For the CB technology, the average throughput of the cell is not significantly affected, but a beam-forming vector of a UE in the coordinating cell needs to be adjusted, thus degrading the performance of the UE to some extent.

In view of this, the prior downlink CoMP technology, simply adopting one of the downlink CoMP transmission methods (JT, CS, or CB), fails to adapt to a varying network environment dynamically, and is unable to achieve good performance in a time-varying radio channel environment and cell load environment.

SUMMARY

An object of the disclosure is to provide a method and apparatus for adaptive downlink CoMP, so as to address the problem that the prior downlink CoMP technology is unable to adapt to a varying network environment dynamically.

The object of the disclosure is attained in the following technological solutions.

A method for adaptive downlink CoMP transmission at a base station side includes: determining each coordinating cell corresponding to a serving cell of a downlink CoMP UE; calculating a cell load value of each cooperating cell; determining a transmission mode to be applied to the downlink CoMP UE in each cooperating cell based upon the cell load value of each cooperating cell, and calculating the number of cooperating cells corresponding to each transmission mode; and determining a transmission mode of the downlink CoMP UE based upon the number of cooperating cells corresponding to each transmission mode.

In this way, the problem in the prior art of failing to adapt to a varying network environment dynamically in downlink CoMP can be addressed to improve the performance of a cell edge user without degrading the average throughput of a cell, thus improving the overall performance of downlink CoMP.

Optionally calculating a cell load value of each cooperating cell includes: calculating the number of Physical Resource Blocks (PRBs) required for transmitting a downlink service in each cooperating cell, and the number of available PRBs of each cooperating cell and calculating a ratio of the number of PRBs required for transmitting a downlink service in each cooperating cell to the number of available PRBs of the same cooperating cell respectively, to obtain the cell load value of each cooperating cell.

Optionally determining a transmission mode to be applied to the downlink CoMP UE in each cooperating cell based upon the cell load value of each cooperating cell includes: for each cooperating cell: if the cell load value of the cooperating cell is above or equal to a preset cell load upper threshold, then determining the CB transmission mode to be applied to the downlink CoMP UE in the cooperating cell; if the cell load value of the cooperating cell is below or equal to a preset cell load lower threshold, then selecting one of the JT and the CS transmission modes based upon a preset condition as a transmission mode to be applied to the downlink CoMP UE in the cooperating cell; and if the cell load value of the cooperating cell is above a preset cell load lower threshold, and below a preset cell load upper threshold, then obtaining a channel correlation value between the downlink CoMP UE and a UE in the cooperating cell, and if the channel correlation value is not above a preset channel correlation threshold, then determining the CB transmission mode to be applied to the downlink CoMP UE in the cooperating cell; otherwise, selecting one of the JT and the CS transmission modes based upon a preset condition as a transmission mode to be applied to the downlink CoMP UE in the cooperating cell.

Optionally selecting one of the JT and the CS transmission modes based upon a preset condition as a transmission mode to be applied to the downlink CoMP UE in the cooperating cell includes: if it is determined that the downlink CoMP UE satisfies the preset condition, then determining the CS transmission mode to be applied to the downlink CoMP UE in the cooperating cell; otherwise, obtaining a downlink channel quality value of the downlink CoMP UE in the cooperating cell, then determining whether the downlink channel quality value is above a preset channel quality threshold or not, and if the downlink channel quality value is above the preset channel quality threshold, then determining the JT transmission mode to be applied to the downlink CoMP UE in the cooperating cell; otherwise, determining the CS transmission mode to be applied to the downlink CoMP UE in the cooperating cell.

Optionally if it is determined that the downlink CoMP UE satisfies the preset condition, then determining the CS transmission mode to be applied to the downlink CoMP UE in the cooperating cell includes: if another TM mode, other than or TM7 and TM8 mode is determined to be applied to the downlink CoMP UE, then determining the CS transmission mode to be applied to the downlink CoMP UE in the cooperating cell; or if it is determined that a Sounding Reference Signal (SRS) resource of the downlink CoMP UE conflicts with an SRS resource of a UE in the cooperating cell, then determining the CS transmission mode to be applied to the downlink CoMP UE in the cooperating cell; or if it is determined that the downlink CoMP UE has a PRB cooperating resource overlapping with a PRB cooperating resource requested by at least one another downlink CoMP UE in the same cooperating cell, then determining the CS transmission mode to be applied to the downlink CoMP UE in the cooperating cell.

Optionally determining a transmission mode of the downlink CoMP UE based upon the number of cooperating cells corresponding to each transmission mode includes: selecting at least one transmission mode with the largest number of corresponding cooperating cells, based upon the number of cooperating cells corresponding to each transmission mode; and if the at least one transmission mode includes only one transmission mode, then selecting the transmission mode as the transmission mode to be applied to the downlink CoMP UE; or if the at least one transmission mode includes at least two transmission modes, then selecting one of the at least one transmission mode with the highest priority according to a preset order of priorities of the transmission modes as the transmission mode to be applied to the downlink CoMP UE.

An apparatus for adaptive downlink CoMP at the base station side includes: a determining unit configured to determine each coordinating cell corresponding to a serving cell of a downlink CoMP UE; a first calculating unit configured to calculate a cell load value of each cooperating cell; a second calculating unit configured to determine a transmission mode to be applied to the downlink CoMP UE in each cooperating cell based upon the cell load value of each cooperating cell, and to calculate the number of cooperating cells corresponding to each transmission mode; and a processing unit configured to determine a transmission mode of the downlink CoMP UE based upon the number of cooperating cells corresponding to each transmission mode.

In this way, the problem in the prior art of failing to adapt to a varying network environment dynamically in downlink CoMP can be addressed to improve the performance of a cell edge user without degrading the average throughput of a cell, thus improving the overall performance of downlink CoMP.

Optionally the first calculating unit configured to calculate a cell load value of each cooperating cell is configured to: calculate the number of PRBs required for transmitting a downlink service in each cooperating cell, and the number of available PRBs of each cooperating cell, and calculate a ratio of the number of PRBs required for transmitting a downlink service in each cooperating cell to the number of available PRBs of the same cooperating cell respectively, to obtain the cell load value of each cooperating cell.

Optionally the second calculating unit configured to determine a transmission mode to be applied to the downlink CoMP UE in each cooperating cell based upon the cell load value of each cooperating cell is configured to: for each cooperating cell: if the cell load value of the cooperating cell is above or equal to a preset cell load upper threshold, then determine the CB transmission mode to be applied to the downlink CoMP UE in the cooperating cell; if the cell load value of the cooperating cell is below or equal to a preset cell load lower threshold, then select one of the JT and the CS transmission modes based upon a preset condition as a transmission mode to be applied to the downlink CoMP UE in the cooperating cell; and if the cell load value of the cooperating cell is above a preset cell load lower threshold, and below a preset cell load upper threshold, then obtain a channel correlation value between the downlink CoMP UE and a UE in the cooperating cell, and if the channel correlation value is not above a preset channel correlation threshold, then determine the CB transmission mode to be applied to the downlink CoMP UE in the cooperating cell; otherwise, select one of the JT and the CS transmission modes based upon a preset condition as a transmission mode to be applied to the downlink CoMP UE in the cooperating cell.

Optionally the second calculating unit configured to select one of the JT and the CS transmission modes based upon a preset condition as a transmission mode to be applied to the downlink CoMP UE in the cooperating cell is configured to: if it is determined that the downlink CoMP UE satisfies the preset condition, then determine the CS transmission mode to be applied to the downlink CoMP UE in the cooperating cell; otherwise, obtain a downlink channel quality value of the downlink CoMP UE in the cooperating cell, then determine whether the downlink channel quality value is above a preset channel quality threshold or not, and if the downlink channel quality value is above the preset channel quality threshold, then determine the JT transmission mode to be applied to the downlink CoMP UE in the cooperating cell; otherwise, determine the CS transmission mode to be applied to the downlink CoMP UE in the cooperating cell.

Optionally the second calculating unit configured, if it is determined that the downlink CoMP UE satisfies the preset condition, then to determine the CS transmission mode to be applied to the downlink CoMP UE in the cooperating cell is configured to: if another TM mode, neither the TM7 mode nor the TM8 mode, is determined to be applied to the downlink CoMP UE, then determine the CS transmission mode to be applied to the downlink CoMP UE in the cooperating cell; or if it is determined that an SRS resource of the downlink CoMP UE conflicts with an SRS resource of a UE in the cooperating cell, then determine the CS transmission mode to be applied to the downlink CoMP UE in the cooperating cell; or if it is determined that the downlink CoMP UE has a PRB cooperating resource overlapping with a PRB cooperating resource requested by at least one another downlink CoMP UE in the same cooperating cell, then determine the CS transmission mode to be applied to the downlink CoMP UE in the cooperating cell.

Optionally the processing unit configured to determine a transmission mode of the downlink CoMP UE based upon the number of cooperating cells corresponding to each transmission mode is configured to: select at least one transmission mode with the largest number of corresponding cooperating cells, based upon the number of cooperating cells corresponding to each transmission mode; and if the at least one transmission mode includes only one transmission mode, then select the transmission mode as the transmission mode to be applied to the downlink CoMP UE; or if the at least one transmission mode includes at least two transmission modes, then select one of the at least one transmission mode with the highest priority according to a preset order of priorities of the transmission modes as the transmission mode to be applied to the downlink CoMP UE.

BRIEF DESCRIPTION OF THE DRAWINGS

In order to make the technical solutions in the embodiments of the disclosure more clear, drawings to be used in a description of embodiments will be briefly introduced below, and apparently the drawings to be described below are merely illustrative of some embodiments of the disclosure, and those ordinarily skilled in the art can derive from these drawings other drawings without any inventive effort.

DETAILED DESCRIPTION OF THE EMBODIMENTS

In order to make the objects, the technical solutions and the advantages of the disclosure more apparent, the disclosure will be further described in details with reference to the drawings. Apparently the described embodiments are only a part, other than all, of the embodiments of the disclosure. Based upon the embodiments of the disclosure here, all of other embodiments derived by those ordinarily skilled in the art without any inventive effort shall come into the scope of the disclosure.

There has been absent in the prior art a solution to adaptive selection of transmission modes, e.g., JT, CS, or CB, each of which is applicable to different scenarios in practice, so an embodiment of the disclosure proposes an innovative technical solution to adaptive selection of JT/CS/CB, which, when compared with solutions enabling simply one of JT, CS, and CB, can enable downlink CoMP adapt dynamically to changes of a network environment, thereby improving the overall performance of the downlink CoMP. Particularly, the embodiments of the disclosure innovatively propose an adaptive selection of JT/CS/CB based upon information such as a cell load, channel correlation, a radio resource state, a Transmission Mode (TM), a downlink Channel Quality Indicator (CQI), taking into account factors such as a cell load, a channel state, and a radio resource state, thereby improving the performance of a cell edge user without degrading the average throughput of a cell, thus improving the overall performance of the downlink CoMP.

Figure 1:
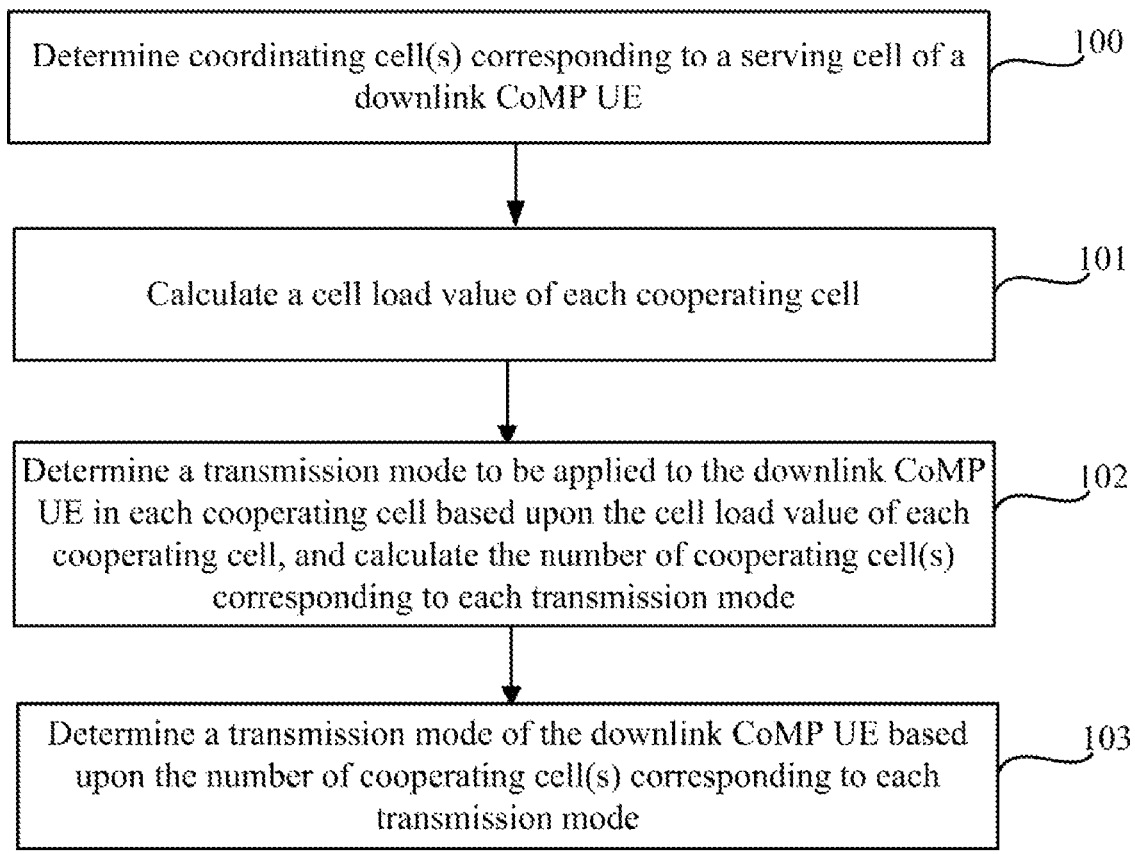
FIG. 1 is a schematic flow chart of a method for adaptive CoMP transmission according to an embodiment of the disclosure.

Referring to FIG. 1, an embodiment of the disclosure provides a method for adaptive downlink CoMP transmission at the base station side in the following flow.

The operation 100 is to determine coordinating cell(s) corresponding to a serving cell of a downlink CoMP UE.

For example, for some downlink CoMP UE, e.g., UE1, a serving cell and its corresponding cooperating cell(s) could be determined using technologies of the prior art, where the number of cooperating cell(s) of UE1 is more than or equal to one.

The operation 101 is to calculate a cell load value of each cooperating cell.

Particularly the cell load value of each cooperating cell is calculated by calculating the number of PRB(s) required for transmitting a downlink service in each cooperating cell and the number of available PRB(s) of each cooperating cell, and calculating a ratio of the number of PRB(s) required for transmitting a downlink service in each cooperating cell to the number of available PRB(s) of the same cooperating cell, respectively, to obtain the cell load value of each cooperating cell.

The operation 102 is to determine a transmission mode to be applied to the downlink CoMP UE in each cooperating cell based upon the cell load value of each cooperating cell, and to calculate the number of cooperating cell(s) corresponding to each transmission mode.

The transmission mode to be applied to the downlink CoMP UE in each cooperating cell, determined on the basis of the cell load value of each cooperating cell, is particularly determined according to the cell load value of each cooperating cell and a cell load threshold including a cell load upper threshold and a cell load lower threshold, in the following three instances.

In a first instance, if a cell load value of a cooperating cell is above or equal to a preset cell load upper threshold, then the CB transmission mode may be determined to be applied to the downlink CoMP UE in the cooperating cell.

In a second instance, if a cell load value of a cooperating cell is below or equal to a preset cell load lower threshold, then one of the transmission modes, the JT and the CS, may be selected based upon a preset condition as a transmission mode to be applied to the downlink CoMP UE in the cooperating cell.

In a third instance, if a cell load value of a cooperating cell is above a preset cell load lower threshold, and below a preset cell load upper threshold, then a channel correlation value between the downlink CoMP UE and a UE in the cooperating cell may be obtained, and if it is determined that the channel correlation value is not above a preset channel correlation threshold, then the CB transmission mode may be determined to be applied to the downlink CoMP UE in the cooperating cell; otherwise, one of the JT and the CS transmission modes may be selected based upon a preset condition as the transmission mode to be applied to the downlink CoMP UE in the cooperating cell.

For example, cooperating cells of a downlink CoMP UE, e.g., UE1, are P1, P2, and P3. Suppose a cell load upper threshold is $Rl_u$ and a cell load lower threshold is $Rl_d$, and cell load values fall into the following three instances as per the interval $[Rl_u, Rl_d]$: if a cell load value of the cooperating cell P1 is above $Rl_u$, then the CB transmission mode may be determined to be applied to UE1 in the cooperating cell P1; if a cell load value of the cooperating cell P2 is below $Rl_d$, then the JT or the CS transmission mode may be determined to be applied to UE1 in the cooperating cell P2, where whether to apply the JT or the CS transmission mode to UE1 in the cooperating cell P2 is determined according to a system preset condition; and if a cell load value of the cooperating cell P3 is above $Rl_d$ and below $Rl_u$, then a channel correlation value between UE1 and a UE in the cooperating cell P3 may be obtained, and if it is determined that the channel correlation value is not above a preset channel correlation threshold, then the CB transmission mode may be determined to be applied to UE1 in the cooperating cell P3; otherwise, the JT or CS transmission mode may be determined to be applied to UE1 in the cooperating cell P3, where similarly whether to apply the JT or the CS transmission mode to UE1 in the cooperating cell P3 is determined according to a system preset condition.

Particularly one of the JT and the CS transmission modes is selected based upon a preset condition as a transmission mode to be applied to the downlink CoMP UE in a cooperating cell as follows: if it is determined that the downlink CoMP UE satisfies the preset condition, then the CS transmission mode may be determined to be applied to the downlink CoMP UE in the cooperating cell; otherwise, a downlink channel quality value of the downlink CoMP UE in the cooperating cell may be obtained, it may be determined whether the downlink channel quality value is above a preset channel quality threshold or not, and if the downlink channel quality value is above the preset channel quality threshold, then the JT transmission mode may be determined to be applied to the downlink CoMP UE in the cooperating cell; otherwise, the CS transmission mode may be determined to be applied to the downlink CoMP UE in the cooperating cell.

Particularly the downlink channel quality value of the downlink CoMP UE in the cooperating cell is obtained based upon a measurement result using an SRS, that is, an uplink Channel Quality Indicator (CQI) is measured according to an SRS signal of the downlink CoMP UE received in the cooperating cell, and based upon channel reciprocity, a downlink CQI is considered to be equivalent to the uplink CQI of the downlink CoMP UE. This rule may only be applicable to a TD-LTE system.

Particularly, if it is determined that the downlink CoMP UE satisfies the preset condition, then the CS transmission mode may be determined to be applied to the downlink CoMP UE in the cooperating cell, where the preset condition includes one of the following rules.

A first rule is that if another TM mode, neither the TM7 mode nor the TM8 mode, is determined to be applied to the downlink CoMP UE, then the CS transmission mode may be determined to be applied to the downlink CoMP UE in the cooperating cell.

A second rule is that if it is determined that an SRS resource of the downlink CoMP UE conflicts with an SRS resource of a UE in the cooperating cell, then the CS transmission mode may be determined to be applied to the downlink CoMP UE in the cooperating cell.

A third rule is that if it is determined that the downlink CoMP UE has a Physical Resource Block (PRB) cooperating resource overlapping with a PRB cooperating resource requested by at least one another downlink CoMP UE in the same cooperating cell, then the CS transmission mode may be determined to be applied to the downlink CoMP UE in the cooperating cell.

The operation 103 is to determine a transmission mode of the downlink CoMP UE based upon the number of cooperating cell(s) corresponding to each transmission mode.

Particularly the transmission mode of the downlink CoMP UE is determined based upon the number of cooperating cell(s) corresponding to each transmission mode as follows: at least one transmission mode with the largest number of corresponding cooperating cell(s) is selected based upon the number of cooperating cell(s) corresponding to each transmission mode; and if the at least one transmission mode includes only one transmission mode, then the transmission mode may be selected as the transmission mode to be applied to the downlink CoMP UE; or if the at least one transmission mode includes at least two transmission modes, then one of the at least one transmission mode with the highest priority may be selected as the transmission mode to be applied to the downlink CoMP UE according to a preset order of priorities of the transmission modes.

For example, if the downlink CoMP transmission modes (JT, CS, or CB) determined by respective cooperating cells of a downlink CoMP UE are different, then if a base station supports the different downlink CoMP transmission modes to be applied in the respective cooperating cells, then each cooperating cell may apply its determined downlink CoMP transmission mode; otherwise, the downlink CoMP transmission modes of the respective cooperating cells may be adjusted as follows, so that a same downlink CoMP transmission mode is applied in each cooperating cell.

If the number of cooperating cell(s) where the JT transmission mode is applied among all the cooperating cells of the downlink CoMP UE is NJT, the number of cooperating cell(s) where the CS transmission mode is applied is NCS, and the number of cooperating cell(s) where the CB transmission mode is applied is NCB, where the priority of CS is the highest, the priority of CB is the second highest, and the priority of JT is the lowest, then the downlink CoMP transmission modes may be adjusted as follows.

(1) If NJT>NCS, and NJT>NCB, then JT may be applied to all the cooperating cells; if NCS>NJT, and NCS>NCB, then CS may be applied to all the cooperating cells; and if NCB>NCS, and NCB>NJT, then CB may be applied to all the cooperating cells.

(2) If NJT=NCS, and NJT≥NCB, then CS may be applied to all the cooperating cells; if NCB=NCS, and NCB≥NJT, then CS may be applied to all the cooperating cells; and if NCB=NJT, and NCB>NCS, then CB may be applied to all the cooperating cells.

Furthermore the transmission mode to be applied to the downlink CoMP UE in the cooperating cell is determined as a transmission mode of the downlink CoMP UE.

Figure 2:
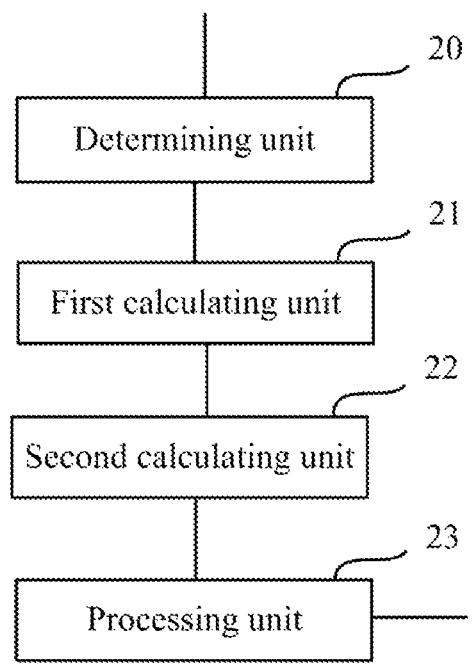
FIG. 2 is a schematic structural diagram of an apparatus for adaptive CoMP transmission according to an embodiment of the disclosure.

Based upon the technical solution above, referring to FIG. 2, an embodiment of the disclosure provides an apparatus for adaptive downlink CoMP transmission, which includes a determining unit 20, a first calculating unit 21, a second calculating unit 22, and a processing unit 23, where: the determining unit 20 is configured to determine each coordinating cell corresponding to a serving cell of a CoMP UE; the first calculating unit 21 is configured to calculate a cell load value of the each cooperating cell; the second calculating unit 22 is configured to determine a transmission mode to be applied to the downlink CoMP UE in each cooperating cell based upon the cell load value of each cooperating cell, and to calculate the number of cooperating cell(s) corresponding to each transmission mode; and the processing unit 23 is configured to determine a transmission mode of the downlink CoMP UE based upon the number of cooperating cell(s) corresponding to each transmission mode.

Optionally the first calculating unit 21 configured to calculate a cell load value of each cooperating cell is configured to: calculate the number of PRB(s) required for transmitting a downlink service in each cooperating cell and the number of available PRB(s) of each cooperating cell, and calculate a ratio of the number of PRB(s) required for transmitting a downlink service in the each cooperating cell to the number of available PRB(s) of the same cooperating cell, respectively, to obtain the cell load values of each cooperating cells.

Optionally the second calculating unit 22 configured to determine a transmission mode to be applied to the downlink CoMP UE in each cooperating cell based upon the cell load value of each cooperating cell is configured to: for each cooperating cell: if the cell load value of the cooperating cell is above or equal to a preset cell load upper threshold, determine the CB transmission mode to be applied to the downlink CoMP UE in the cooperating cell; if the cell load value of the cooperating cell is below or equal to a preset cell load lower threshold, determine one of the JT and the CS transmission modes based upon a preset condition as a transmission mode to be applied to the downlink CoMP UE in the cooperating cell; and if the cell load value of the cooperating cell is above a preset cell load lower threshold, and below a preset cell load upper threshold, obtain a channel correlation value between the downlink CoMP UE and a UE in the cooperating cell, and if the channel correlation value is not above a preset channel correlation threshold, determine the CB transmission mode to be applied to the downlink CoMP UE in the cooperating cell; otherwise, select one of the JT and the CS transmission modes based upon a preset condition as the transmission mode to be applied to the downlink CoMP UE in the cooperating cell.

Optionally the second calculating unit 22 configured to select one of the JT and the CS transmission modes as the transmission mode to be applied to the downlink CoMP UE in the cooperating cell based upon the preset condition is configured to: if it is determined that the downlink CoMP UE satisfies the preset condition, determine the CS transmission mode to be applied to the downlink CoMP UE in the cooperating cell; otherwise, obtain a downlink channel quality value of the downlink CoMP UE in the cooperating cell, determine whether the downlink channel quality value is above a preset channel quality threshold, and if so, determine the JT transmission mode to be applied to the downlink CoMP UE in the cooperating cell; otherwise, determine the CS transmission mode to be applied to the downlink CoMP UE in the cooperating cell.

Optionally the second calculating unit 22 configured, if it is determined that the downlink CoMP UE satisfies the preset condition, determine the CS transmission mode to be applied to the downlink CoMP UE in the cooperating cell is configured to: if another TM mode, neither the TM7 mode nor the TM8 mode, is determined to be applied to the downlink CoMP UE, determine the CS transmission mode to be applied to the downlink CoMP UE in the cooperating cell; or if it is determined that an SRS resource of the downlink CoMP UE conflicts with an SRS resource of a UE in the cooperating cell, determine the CS transmission mode to be applied to the downlink CoMP UE in the cooperating cell; or if it is determined that the downlink CoMP UE has a Physical Resource Block (PRB) cooperating resource overlapping with a PRB cooperating resource requested by at least one another downlink CoMP UE in the same cooperating cell, determine the CS transmission mode to be applied to the downlink CoMP UE in the cooperating cell.

Optionally the processing unit 23 configured to determine the transmission mode of the downlink CoMP UE based upon the number of cooperating cell(s) corresponding to each transmission mode is configured to: select at least one transmission mode with the largest number of corresponding cooperating cell(s), based upon the number of cooperating cell(s) corresponding to each transmission mode; and if the at least one transmission mode includes only one transmission mode, select the transmission mode as the transmission mode to be applied to the downlink CoMP UE; or if the at least one transmission mode includes at least two transmission modes, select one of the at least one transmission mode with the highest priority according to a preset order of priorities of the transmission modes as the transmission mode to be applied to the downlink CoMP UE.

In summary, in the embodiments of the disclosure, each coordinating cell corresponding to a serving cell of a downlink CoMP UE is determined; a cell load value of each cooperating cell is calculated; a transmission mode to be applied to the downlink CoMP UE in each cooperating cell is determined based upon the cell load value of each cooperating cell, and the number of cooperating cell(s) corresponding to each transmission mode is calculated; and a transmission mode of the downlink CoMP UE is determined based upon the number of cooperating cell(s) corresponding to each transmission mode, so that the problem in the prior downlink CoMP technology of failing to adapt to a varying network environment dynamically can be addressed and the overall performance of downlink CoMP is improved.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for adaptive downlink Coordinated Multi-Point (CoMP) transmission, applied at a base station side, the method comprising:
   determining each coordinating cell corresponding to a serving cell of a downlink CoMP User Equipment (UE);
   calculating a cell load value of each cooperating cell;
   determining a transmission mode to be applied to the downlink CoMP UE in each cooperating cell based upon the cell load value of each cooperating cell, and calculating the number of cooperating cells corresponding to each transmission mode; and
   determining a transmission mode of the downlink CoMP UE based upon the number of cooperating cells corresponding to each transmission mode;
   wherein the calculating the cell load value of each cooperating cell comprises:
   calculating the number of Physical Resource Blocks (PRBs) required for transmitting a downlink service in each cooperating cell, and the number of available PRBs of each cooperating cell, and calculating a ratio of the number of PRBs required for transmitting a downlink service in each cooperating cell to the number of available PRBs of the same cooperating cell respectively, to obtain the cell load value of each cooperating cell.

2. The method according to claim 1, wherein determining a transmission mode to be applied to the downlink CoMP UE in each cooperating cell based upon the cell load value of each cooperating cell comprises:
   for each cooperating cell:
   if the cell load value of the cooperating cell is above or equal to a preset cell load upper threshold, then determining the Coordinated Beam-forming (CB) transmission mode to be applied to the downlink CoMP UE in the cooperating cell;
   if the cell load value of the cooperating cell is below or equal to a preset cell load lower threshold, then selecting one of the Joint Transmission (JT) and the Coordinated Scheduling (CS) transmission modes based upon a preset condition as a transmission mode to be applied to the downlink CoMP UE in the cooperating cell; and
   if the cell load value of the cooperating cell is above a preset cell load lower threshold, and below a preset cell load upper threshold, then obtaining a channel correlation value between the downlink CoMP UE and a UE in the cooperating cell, and if the channel correlation value is not above a preset channel correlation threshold, then determining the CB transmission mode to be applied to the downlink CoMP UE in the cooperating cell; otherwise, selecting one of the JT and the CS transmission modes based upon a preset condition as a transmission mode to be applied to the downlink CoMP UE in the cooperating cell.

3. The method according to claim 2, wherein selecting one of the JT and the CS transmission modes based upon a preset condition as a transmission mode to be applied to the downlink CoMP UE in the cooperating cell comprises:
   if it is determined that the downlink CoMP UE satisfies the preset condition, then determining the CS transmission mode to be applied to the downlink CoMP UE in the cooperating cell;
   otherwise, obtaining a downlink channel quality value of the downlink CoMP UE in the cooperating cell, then determining whether the downlink channel quality value is above a preset channel quality threshold or not, and if the downlink channel quality value is above the preset channel quality threshold, then determining the JT transmission mode to be applied to the downlink CoMP UE in the cooperating cell; otherwise, determining the CS transmission mode to be applied to the downlink CoMP UE in the cooperating cell.

4. The method according to claim 3, wherein if it is determined that the downlink CoMP UE satisfies the preset condition, then determining the CS transmission mode to be applied to the downlink CoMP UE in the cooperating cell comprises:
   if another TM mode, neither the TM7 mode nor the TM8 mode, is determined to be applied to the downlink CoMP UE, then determining the CS transmission mode to be applied to the downlink CoMP UE in the cooperating cell; or
   if it is determined that a Sounding Reference Signal (SRS) resource of the downlink CoMP UE conflicts with an SRS resource of a UE in the cooperating cell, then determining the CS transmission mode to be applied to the downlink CoMP UE in the cooperating cell; or
   if it is determined that the downlink CoMP UE has a PRB cooperating resource overlapping with a PRB cooperating resource requested by at least one another downlink CoMP UE in the same cooperating cell, then determining the CS transmission mode to be applied to the downlink CoMP UE in the cooperating cell.

5. The method according to claim 1, wherein determining a transmission mode of the downlink CoMP UE based upon the number of cooperating cells corresponding to each transmission mode comprises:
   selecting at least one transmission mode with the largest number of corresponding cooperating cells, based upon the number of cooperating cells corresponding to each transmission mode; and
   if the at least one transmission mode comprises only one transmission mode, then selecting the transmission mode as the transmission mode to be applied to the downlink CoMP UE; or
   if the at least one transmission mode comprises at least two transmission modes, then selecting one of the at least one transmission mode with the highest priority according to a preset order of priorities of the transmission modes as the transmission mode to be applied to the downlink CoMP UE.

6. An apparatus for adaptive downlink CoMP transmission, applied at a base station side, the apparatus comprising:
   a memory, configured to store at least one instruction;

a processor, configured to execute the at least one instruction to:
determine a transmission mode to be applied to the downlink CoMP UE in each cooperating cell based upon the cell load value of each cooperating cell;
calculate the number of cooperating cells corresponding to each transmission mode;
determine a transmission mode of the downlink CoMP UE based upon the number of cooperating cells corresponding to each transmission mode; and
calculate the number of PRBs required for transmitting a downlink service in each cooperating cell, and the number of available PRBs of each cooperating cell, and calculate a ratio of the number of PRBs required for transmitting a downlink service in each cooperating cell to the number of available PRBs of the same cooperating cell respectively, to obtain the cell load value of each cooperating cell.

7. The apparatus according to claim 6, wherein the processor is configured to execute the at least one instruction to:
for each cooperating cell:
if the cell load value of the cooperating cell is above or equal to a preset cell load upper threshold, then determine the CB transmission mode to be applied to the downlink CoMP UE in the cooperating cell;
if the cell load value of the cooperating cell is below or equal to a preset cell load lower threshold, then select one of the JT and the CS transmission modes based upon a preset condition as a transmission mode to be applied to the downlink CoMP UE in the cooperating cell; and
if the cell load value of the cooperating cell is above a preset cell load lower threshold, and below a preset cell load upper threshold, then obtain a channel correlation value between the downlink CoMP UE and a UE in the cooperating cell, and if the channel correlation value is not above a preset channel correlation threshold, then determine the CB transmission mode to be applied to the downlink CoMP UE in the cooperating cell; otherwise, select one of the JT and the CS transmission modes based upon a preset condition as a transmission mode to be applied to the downlink CoMP UE in the cooperating cell.

8. The apparatus according to claim 7, wherein the processor is configured to execute the at least one instruction to:
if it is determined that the downlink CoMP UE satisfies the preset condition, then determine the CS transmission mode to be applied to the downlink CoMP UE in the cooperating cell; otherwise, obtain a downlink channel quality value of the downlink CoMP UE in the cooperating cell, then determine whether the downlink channel quality value is above a preset channel quality threshold or not, and if the downlink channel quality value is above the preset channel quality threshold, then determine the JT transmission mode to be applied to the downlink CoMP UE in the cooperating cell; otherwise, determine the CS transmission mode to be applied to the downlink CoMP UE in the cooperating cell.

9. The apparatus according to claim 8, wherein the processor is configured to execute the at least one instruction to:
if another TM mode, neither the TM7 mode nor the TM8 mode, is determined to be applied to the downlink CoMP UE, then determine the CS transmission mode to be applied to the downlink CoMP UE in the cooperating cell; or
if it is determined that an SRS resource of the downlink CoMP UE conflicts with an SRS resource of a UE in the cooperating cell, then determine the CS transmission mode to be applied to the downlink CoMP UE in the cooperating cell; or
if it is determined that the downlink CoMP UE has a PRB cooperating resource overlapping with a PRB cooperating resource requested by at least one another downlink CoMP UE in the same cooperating cell, then determine the CS transmission mode to be applied to the downlink CoMP UE in the cooperating cell.

10. The apparatus according to claim 6, wherein the processor is configured to execute the at least one instruction to:
select at least one transmission mode with the largest number of corresponding cooperating cells, based upon the number of cooperating cells corresponding to each transmission mode; and
if the at least one transmission mode comprises only one transmission mode, then select the transmission mode as the transmission mode to be applied to the downlink CoMP UE; or
if the at least one transmission mode comprises at least two transmission modes, then select one of the at least one transmission mode with the highest priority according to a preset order of priorities of the transmission modes as the transmission mode to be applied to the downlink CoMP UE.

* * * * *